(12) United States Patent
Wilson et al.

(10) Patent No.: US 12,447,674 B2
(45) Date of Patent: Oct. 21, 2025

(54) THREE-DIMENSIONAL PRINTING WITH BINDER AGENT

(71) Applicant: PERIDOT PRINT LLC, Palo Alto, CA (US)

(72) Inventors: Karsten N. Wilson, Corvallis, OR (US); Emre Hiro Discekici, San Diego, CA (US); Vladek Kasperchik, Corvallis, OR (US); Timothy L. Weber, Corvallis, OR (US); Sterling Chaffins, Corvallis, OR (US); Devin Alexander Mourey, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 155 days.

(21) Appl. No.: 18/290,309

(22) PCT Filed: Jun. 3, 2021

(86) PCT No.: PCT/US2021/035775
§ 371 (c)(1),
(2) Date: Nov. 13, 2023

(87) PCT Pub. No.: WO2022/256014
PCT Pub. Date: Dec. 8, 2022

(65) Prior Publication Data
US 2024/0269921 A1     Aug. 15, 2024

(51) Int. Cl.
*B29C 64/165*     (2017.01)
*B29C 64/188*     (2017.01)
(Continued)

(52) U.S. Cl.
CPC .......... *B29C 64/165* (2017.08); *B29C 64/188* (2017.08); *B29C 64/264* (2017.08);
(Continued)

(58) Field of Classification Search
CPC ... B29C 64/165; B29C 64/188; B29C 64/264; B33Y 10/00; B33Y 30/00; B33Y 40/20; B33Y 70/00; B29K 2221/00
See application file for complete search history.

(56) References Cited

U.S. PATENT DOCUMENTS 7,365,129 B2 *   4/2008   Kramer .................... C08F 8/00
                                                      525/239
10,538,032 B2 *  1/2020   Birecki ................. B29C 64/291
(Continued)

FOREIGN PATENT DOCUMENTS

WO   2018/156933 A1   8/2018
WO   2018/156938 A1   8/2018
WO   2020/060567 A1   3/2020

*Primary Examiner* — Nahida Sultana
(74) *Attorney, Agent, or Firm* — Dierker & Kavanaugh, P.C.

(57) ABSTRACT

Methods of three-dimensional printing can include iteratively applying a polymer build material as individual layers to a powder bed, where the polymer build material includes from about 80 wt % to 100 wt % polymer build particles, and based on a three-dimensional object model, selectively applying a binder agent including an aqueous liquid vehicle and polymer binder particles onto the individual layers of the polymer build material. The polymer binder particles have or are capable of having a melting temperature lower than a melting temperature of the polymer build particles. The methods can include exposing the powder bed to heat at a temperature less than a melting point of the polymer build particles but greater than a melting temperature of the polymer binder particles. The heat causes the polymer binder particles to melt to adhere the polymer build particles together to form a three-dimensional object.

15 Claims, 2 Drawing Sheets

(51) Int. Cl.
*B29C 64/264* (2017.01)
*B29K 221/00* (2006.01)
*B33Y 10/00* (2015.01)
*B33Y 30/00* (2015.01)
*B33Y 40/20* (2020.01)

(52) U.S. Cl.
CPC .............. *B33Y 10/00* (2014.12); *B33Y 30/00* (2014.12); *B33Y 40/20* (2020.01); *B29K 2221/00* (2013.01)

(56) References Cited

U.S. PATENT DOCUMENTS 10,913,207 B2 * 2/2021 Ederer .................. B29C 64/165
2018/0050491 A1 * 2/2018 Ishihara ................. B33Y 10/00

* cited by examiner

100 ⤴

```
┌─────────────────────────────────────────────────────────────┐
│ iteratively applying a polymer build material as individual │
│ layers to a powder bed, wherein the polymer build material  │ ─110
│ includes from about 80 wt% to 100 wt% polymer build         │
│ particles                                                   │
└─────────────────────────────────────────────────────────────┘
                               │
┌─────────────────────────────────────────────────────────────┐
│ based on a three-dimensional object model, selectively      │
│ applying a binder agent including an aqueous liquid vehicle │
│ and polymer binder particles onto individual layers of the  │
│ polymer build material to leave polymer binder particles    │
│ therewith, wherein the polymer binder particles have an     │
│ average particle size from about 5 nm to about 500 nm and   │ ─120
│ have a melting temperature that is lower than a melting     │
│ temperature of the polymer build particles of the build     │
│ material or a melting temperature reducible by a coalescing │
│ solvent to a melting temperature that is lower than a       │
│ melting temperature of the polymer build particles of the   │
│ build material                                              │
└─────────────────────────────────────────────────────────────┘
                               │
┌─────────────────────────────────────────────────────────────┐
│ exposing the powder bed to heat at a temperature less than  │
│ a melting point of the polymer build particles but greater  │
│ than a melting temperature of the polymer binder particles, │ ─130
│ wherein the heat causes the polymer binder particles to     │
│ melt and adhere the polymer build particles of the polymeric│
│ build material together to form a three-dimensional object  │
└─────────────────────────────────────────────────────────────┘
```

FIG. 1

THREE-DIMENSIONAL PRINTING WITH BINDER AGENT

BACKGROUND

Three-dimensional (3D) printing is a printing process used to make three-dimensional solid parts from a digital model. Three-dimensional printing is often used in rapid product prototyping, mold generation, mold master generation, and/or short run manufacturing. Some three-dimensional printing techniques are considered additive manufacturing processes because they involve for instance the application of successive layers of build material. This is unlike other machining processes, which often rely upon the removal of material to create the final part or object.

BRIEF DESCRIPTION OF THE DRAWINGS

FIG. 1 is a flow diagram illustrating example methods of three-dimensional printing in accordance with the present disclosure;

DETAILED DESCRIPTION

Figure 2:
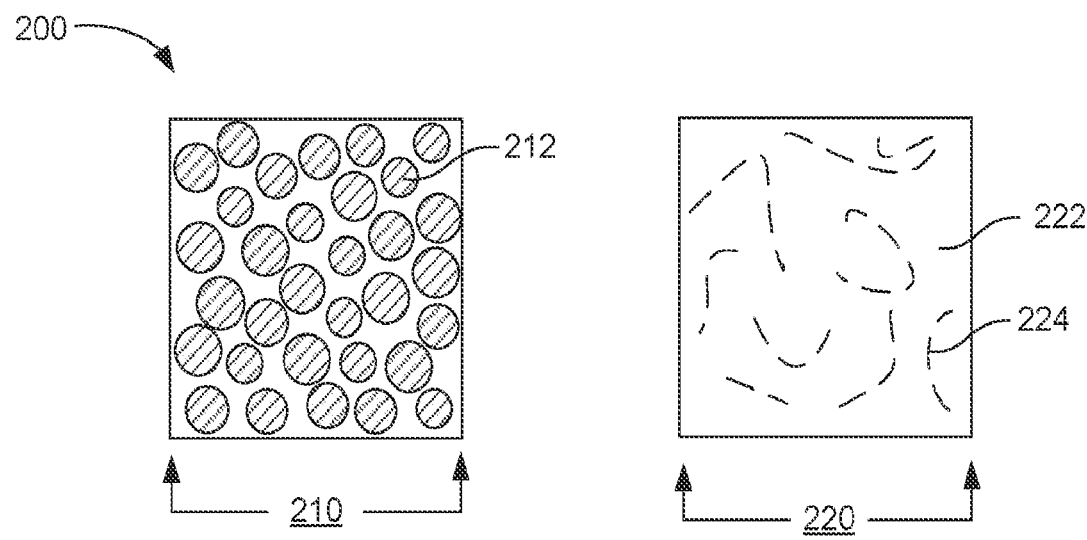
FIG. 2 is a schematic illustration example three-dimensional printing kits in accordance with the present disclosure.

Three-dimensional printing using polymer particles is additive process involving the application of successive layers of a polymer build material. More specifically, a fusing agent including a radiation absorber is selectively applied to a layer of a polymer build material positioned on a support bed, e.g., a build platform supporting polymer build material, to pattern a selected region of a layer of the polymer build material. The layers of the polymer build material can be iteratively exposed to electromagnetic radiation and due to the presence of the electromagnetic radiation absorber on just the printed portions, the electromagnetic energy applied generates additional heat due to the presence of the radiation absorber in the patterned or selected regions, causing the polymer particles of the polymer build material to become heat fused together. Other portions of the polymer build material do not likewise reach temperatures suitable to melt or coalesce together, leaving the powder essentially intact, not becoming part of the three-dimensional printed object. Upon repeating this on a layer-by-layer basis, the three-dimensional printed object is formed within the powder bed of polymer build material. However, there are other ways to promote selective heat fusing of the polymer build material layers during the build, as described in the context of the present disclosure.

In accordance with this, methods of three-dimensional printing include iteratively applying a polymer build material as individual layers to a powder bed, where the polymer build material can include from about 80 wt % to 100 wt % polymer build particles. Based on a three-dimensional object model, the methods also include selectively applying a binder agent that can include an aqueous liquid vehicle and polymer binder particles onto individual layers of the polymer build material, where the polymer binder particles can have an average particle size from about 5 nm to about 500 nm and a melting temperature that can be lower than a melting temperature of the polymer build particles of the build material, or which can have a melting temperature reducible (e.g., that can be lowered) by a coalescing solvent to a melting temperature lower than a melting temperature of the polymer build particles. The powder bed is exposed to heat at a temperature less than a melting point of the polymer build particles but greater than a melting temperature of the polymer binder particles, where the heat can cause the polymeric binder to melt and to adhere the polymer build particles together to form a three-dimensional object. In some examples, the polymer build particles can include polyamide-6, polyamide-8, polyamide-9, polyamide-11, polyamide-12, polyamide-6,6, polyamide-6,12, polyamide-8,12, polyamide, thermoplastic polyamide, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or copolymers thereof. The polymer build particles can have an average particle size that can range from about 50 μm to about 1 mm. In some examples, the polymer binder particles can be a latex polymer that can include copolymerized monomers selected from acrylate esters, styrene-based monomers, methacrylate-esters, or a combination thereof. The polymer binder particles can be present in the binder agent at from about 2 wt % to about 20 wt %. In other examples, the heat can be applied at a temperature range of from about 60° C. to about 160° C., and the polymer binder particles can become miscible and can entangle with chains of the polymer build particles. The methods can include separating the three-dimensional object from the powder bed and heat fusing the three-dimensional object further to form a polymeric particle-fused three-dimensional object. The baking can occur in a vacuum oven at a temperature that can range from about 125° C. to about 175° C. for a time period of from about 30 minutes to about 8 hours. In some examples, the methods can include selectively applying a coalescing solvent either together with the binder agent or separately in a coalescing agent onto individual layers of the polymer build material. The coalescing solvent can depress a melting temperature of the polymer particles, the polymer binder particles, or both. Exposing the powder bed to the heat can selectively coalesce portions of individual layers of the polymer build material in contact with the coalescing solvent to form a polymeric particle-fused three-dimensional object. The polymer binder particles and the coalescing solvent can be selectively applied by ejecting the binder agent and the coalescing agent onto the polymer build material. The polymer binder particles and the coalescing solvent can be selectively applied by ejecting the binder agent containing both the polymer binder particles and the coalescing solvent in a common formulation.

Three-dimensional printing kits include a polymer build material having from about 80 wt % to 100 wt % polymer build particles, and a binder agent including an aqueous liquid vehicle and polymer binder particles having an average particle size from about 5 nm to about 500 nm that have a melting temperature that can be lower than a melting temperature of the polymer build particles or a melting temperature reducible (e.g., that can be lowered) by a coalescing solvent to a melting temperature that is lower than a melting temperature of the polymer build particles. The three-dimensional printing kits do not include a fusing agent containing a radiation absorber in this example. In some examples, the three-dimensional printing kits can include the coalescing solvent that can depress a melting temperature of the polymer build particles, the polymer binder particles, or both. The coalescing solvent can be present at from about 30 wt % to about 70 wt % in the binder agent or can be present at from about 30 wt % to about 70 wt % in a separate coalescing agent. In other examples, the polymer binder particles can be a latex polymer including copolymerized monomers selected from acrylate esters, styrene-based monomers, methacrylate esters, or a combination thereof. The polymer binder particles can be present in the binder agent at from about 2 wt % to about 20 wt %.

Systems for three-dimensional printing include a polymer build material, a binder agent, and a radiant heat source. The polymer build material includes from about 80 wt % to 100 wt % polymer build particles. The binder agent includes an aqueous liquid vehicle and polymer binder particles that can have an average particle size from about 5 nm to about 500 nm and that can have a melting temperature that can be lower than a melting temperature of the polymer build particles or a melting temperature reducible (e.g., that can be lowered) by a coalescing solvent to a melting temperature that is lower than a melting temperature of the polymer build particles. The radiant heat source in these example are positioned or positionable to expose a powder bed of the polymer build material to heat at a temperature less than a melting point of the polymer build particles but greater than a melting temperature of the polymer binder particles. The heat causes the polymer binder particles to melt and to adhere the polymer build particles together to form a three-dimensional object. In some examples, the system can include an oven to apply heat to the three-dimensional object at a temperature to heat-fuse the polymer build particles to form a polymeric particle-fused three-dimensional object. In other examples, the system can include a coalescing solvent to depress a melting point of the polymer build particles. The coalescing solvent can depress a melting temperature of the polymer build particles. Exposing the powder bed to the heat can selectively coalesce portions of individual layers of the polymer build material in contact with the coalescing solvent to form a polymeric particle-fused three-dimensional object.

When discussing the methods of three-dimensional printing, the three-dimensional printing three-dimensional printing kits, and/or the systems for three-dimensional printing herein, these discussions can be considered applicable to one another whether or not they are explicitly discussed in the context of that example. Thus, when discussing a polymeric build material related to a three-dimensional printing kit, such disclosure is also relevant to and directly supported in the context of the methods of three-dimensional printing, the system for three-dimensional printing, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Methods of Three-Dimensional Printing

A flow diagram of example methods 100 of three-dimensional printing is shown in FIG. 1. The methods can include iteratively applying 110 a polymer build material as individual layers to a powder bed, where the polymer build material can include from about 80 wt % to 100 wt % polymer build particles. Based on a three-dimensional object model, the methods can include selectively applying 120 a binder agent that can include an aqueous liquid vehicle and polymer binder particles onto individual layers of the polymer build material leaving the polymer binder particles therewith, where the polymer binder particles can have a melting temperature that can be lower than a melting temperature of the polymer build particles of the build material or can have a melting temperature reducible (e.g., that can be lowered) by a coalescing solvent to a melting temperature less than a melting temperature of the polymer build particles of the build material, and exposing 130 the powder bed to heat at a temperature less than a melting point of the polymer build particles but greater than a melting temperature of the polymer binder particles (with our without the introduction of the coalescing solvent), where the heat can cause the polymer binder particles to melt and to adhere the polymer build particles together to form a three-dimensional object.

In printing in a layer-by-layer manner, the polymer build material can be spread, the binder agent applied, the layer of the polymer build material can be exposed to heat, and a build platform can be dropped a distance of 50 µm to 1 mm, which can correspond to the thickness of a printed layer of the three-dimensional object, so that another layer of the polymer build material can be added again thereon to receive another application of the binder agent, and so forth. The methods of layering, selectively applying the binder agent, and exposing the powder bed to heat can be repeated until all the individual polymer build material layers have been created and a three-dimensional object is formed. The methods of three-dimensional printing include examples that do not utilize a fusing agent with a radiation absorber. The binder agent can allow for fusing by acting as a glue that can adhere the polymer build particles together.

The heat can be applied at a temperature that can range from about 60° C. to about 160° C., from about 75° C. to about 125° C., from about 100° C. to about 150° C. from about 60° C. to about 90° C. from about 90° C. to about 120° C., or from about 120° C. to about 160° C. The polymer binder particles can become miscible and can become entangled with chains of the polymer build particles in the polymer build material.

The methods can include separating the three-dimensional object from the powder bed and heat fusing the three-dimensional object to form a polymeric particle-fused three-dimensional object. The heat fusing can provide added adhesion of the polymer build particles to one another by permitting an exterior portion of the polymer build particles to melt and bind with one another. In some examples, heating can occur in an oven, such as a vacuum oven at a temperature that can range from about 125° C. to about 175° C. for a time period of from about 30 minutes to about 8 hours. In other examples, the baking can occur at a temperature that can range from about 125° C. to about 150° C., from about 130° C. to about 170° C., or from about 150° C. to about 175° C. The baking can occur at a time period ranging from about 30 minutes to about 4 hours, from about 1 hour to about 3 hours, from about 3 hours to about 6 hours, from about 4 hours to about 8 hours, or from about 2 hours to about 6 hours.

The methods can include selectively applying a coalescing solvent to individual layers of the polymer build material. The coalescing solvent can be applied either together with the binder agent as a component in the binder agent, in a separate coalescing agent, or both. The coalescing solvent can allow for fusing by depressing a melting point of polymer binder particles, the polymer build particles, or both that are in contact with the coalescing solvent on the powder bed. The powder bed can be heated at a temperature below a melting point of a polymer of the polymer build particles but above the depressed melting point of the polymer build particles in contact with the coalescing solvent. In some examples, the coalescing solvent can depress a melting point of the polymer build particles and/or the polymer binder particles by about 1° C. to about 20° C. which can result in a modified melting point from about 90° C. to about 200° C. The coalescing solvent can depress a melting point of the polymer build particles and/or the polymer binder particles by about 1° C. to about 10° C., from about 10° C. to about 20° C., or from about 5° C. to about 15° C. The depressing can result in a modified melting point ranging from 90° C. to about 120° C., from about 150° C. to about 200° C., from about 150° C. to about 200° C., or from about 120° C. to about 180° C.

As a point of clarity, when referring to the "melting temperature that is below the melting temperature of the polymer build particles, but above that of the polymer binder particles, the temperature that this term is based on is the melting temperature as applied to the powder bed which includes both the polymer build particles and the polymer binder particles. In this context, the melting temperature of the polymer binder particles can be of the particle build particles as applied, or as applied in the presence of a coalescing solvent that lowers the melting temperature of the polymer build particles. In other words, when heat is applied to the power bed typically as individual layers are applied, the polymer build particles may not melt while the polymer binder particles do melt, either based on its inherent material melting temperature or its melting temperature while in contact with a coalescing solvent that acts to lower the melting temperature of the polymer binder particles. As a note, in some examples, the coalescing solvent may likewise lower the melting temperature of the polymer build particles sufficient to cause fusion as well, but this is not always the case. If the polymer build particles can be selectively fused without fusing unprinted powder bed portions, the three-dimensional object may be fused in the powder bed. If the polymer build particles are not fused in the powder bed, the polymer binder particles provide sufficient adhesion in response to heat to move the three-dimensional object to a fusing oven, for example, for fusing of the polymer build particles.

The methods can include preheating the polymer build material prior to dispensing or applying the individual layers of the polymer build material. In some examples, the methods can include preheating the polymer build material prior to dispensing the polymer build material from a spreader into the powder bed. In other examples, the preheating can include heating the polymer build material in the powder bed prior to applying the binder agent and the coalescing solvent thereto. The preheating temperature may be a temperature less than a melting point of polymer build particles.

With respect to applying the binder agent to the polymer build material, the binder agent can be applied such that a specified amount of the binder agent contacts the polymer build material. Accordingly, a weight ratio of the polymer binder particles to polymer build particles following the selective applying of the binder agent onto the polymer build material can range from about 1:3 to about 20:1. In some examples, a weight ratio of the polymer binder particles to polymer build particles following the selective applying of the binder agent onto the polymer build material can range from about from about 1:5 to about 1:15, from about 1:10 to about 1:20, from about 1:3 to about 1:10, or from about 3:1 to about 10:1. The binder agent can be applied at from about 1 g/m$^2$ to about 100 g/m$^2$. In other examples, the binder agent can be applied at from about 5 g/m$^2$ to about 100 g/m$^2$, from about 5 g/m$^2$ to about 50 g/m$^2$, from about 10 to about 50 g/m$^2$, from about 50 g/m$^2$ to about 100 g/m$^2$, from about 25 g/m$^2$ to about 75 g/m$^2$, or from about 30 g/m$^2$ to about 60 g/m$^2$. The applying may be selective and may occur via a digital print head, for example. The amount of binder agent applied can depend on the concentration of polymer binder particles present in the binder agent and the thickness of the build material layer to which the binder agent is to be applied, for example.

With respect to the heat that can be applied to the powder bed, the heat may be in the form of radiant heat which can be applied from above or below the powder bed. In some examples, the heat can be applied from above the powder bed. The heat can be applied at a temperature that can heat the polymer build material to a temperature less than a melting temperature of the polymer build particles. An upper limit of the heat can be based on a melting temperature of a polymer of the polymer build particles. The heat can have a temperature ranging from about 80° C. to about 160° C. and a heating time period can range from about 5 minutes to about 45 minutes. In some examples, the heat can have a temperature ranging from about 80° C. to about 120° C., from about 120° C. to about 160° C., or from about 100° C. to about 140° C. The heating time period can range from about 15 minutes to about 30 minutes, from about 30 minutes to about 45 minutes, or from about 20 minutes to about 40 minutes.

The three-dimensional object formed can be a porous article. In some examples, the porous article can have a porosity that can range from about 20% to about 90% by volume. In other examples, the porous article can have a porosity that can range from about 40% to about 85% by volume or from about 50% to about 75% by volume. A pore size of pores in the porous article can vary based on a particle size of the polymer build particles and to some extent, the coalesced portions of the polymer binder particles.

The three-dimensional object formed can be a plastic filter in some examples. The filter may be a size exclusion filter, a depth filter, water filter, or the like. The filter may be several layers thick. The filter can be from about 2 to about 200 layers thick. In some examples, the filter can be from about 2 to about 80 layers thick, from about 50 to about 150 layers thick, from about 100 to about 200 layers thick, from about 2 layers to about 40 layers, or from about 5 layers to about 7 layers thick.

Three-Dimensional Printing Kits

Three-dimensional printing kits 200, as shown by way of example in FIG. 2, can include a polymer build material 210 and a binder agent 220. The polymer build material can include from about 80 wt % to 100 wt % polymer build particles 212. The binder agent can include an aqueous liquid vehicle 222 and polymer binder particles 224 that can have a melting temperature lower than a melting temperature of the polymer build particles. The polymer binder particles may be dispersed or dissolved in the aqueous liquid vehicle depending on a temperature of the binder agent. Thus, dispersed polymer binder particles may become dissolved in the aqueous liquid vehicle when heated. The binder agent can, for example, may be formulated without a radiation absorber. The three-dimensional printing kits in some example herein do not include a fusing agent with a radiation absorber, for example The three-dimensional printing kits can include a coalescing solvent. The coalescing solvent can be a solvent that can depress a melting point of polymer binder particles, the polymer build particles, or both when contacted therewith. As used herein, "depress" or "depressing" when referring to a melting point of polymer build particles and/or polymer binder particles indicates that the coalescing solvent when in contact with particles can lower a melting temperature of polymer particles to a temperature less than a melting temperature of the polymer of the polymer build particles that is not in contact with the coalescing solvent. In some examples, the lowering can be to a melting temperature 10° C. or more, e.g., lowering by from about 10° C. to about 75° C. less than the melting temperature of the polymer build particles, the polymer binder particles, or both in their neat state. The coalescing solvent can be present at from 30 wt % to about 70 wt %. The coalescing solvent can be present in the binder agent. In other examples, the coalescing solvent can be present in a separate coalescing agent that can include an aqueous liquid vehicle and the coalescing solvent.

Additional detail regarding the polymer build material, the binder agent, and the coalescing solvent (if included) is provided hereinafter, except to mention that the polymer build material may be packaged or co-packaged with the binder agent or the binder agent and the coalescing agent in separate containers, and/or can be combined with the binder agent or the binder agent and the coalescing agent at the time of printing, e.g., loaded together in a three-dimensional printing system.

Systems for Three-Dimensional Printing

Figure 3:
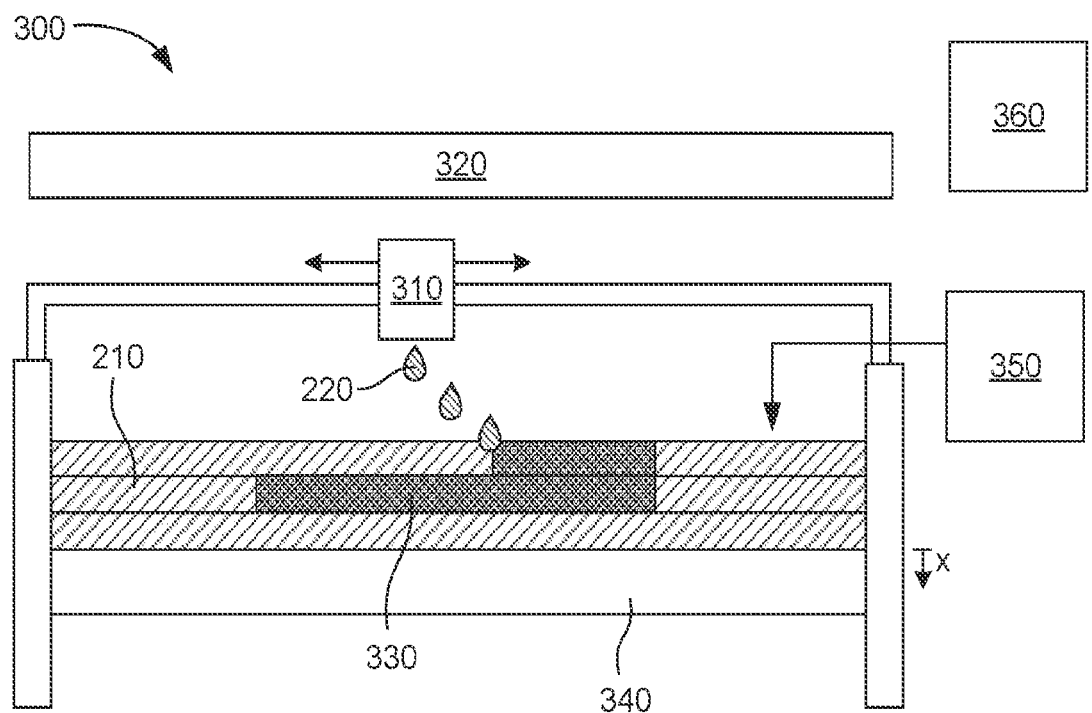
FIG. 3 is a schematic illustration of example three-dimensional printing systems in accordance with the present disclosure.

Systems for three-dimensional printing 300, as shown in FIG. 3, can include a polymer build material 210, a binder agent 220, and a radiant heat source 320. The polymer build material can include from about 80 wt % to 100 wt % polymer build particles. The binder agent can include an aqueous liquid vehicle and dispersed polymer binder particles that can have a melting temperature lower than a melting temperature of the polymer build particles of the build material or a melting temperature reducible by a coalescing solvent to a melting temperature that can be lower than a melting temperature of the polymer build particles of the build material. The radiant heat source can be positioned or positionable to expose the individual layers of the polymer build material to heat at a temperature less than a melting point of the dispersed polymer binder particles and cause the dispersed polymer binder particles to melt and adhere the polymer build particles together to iteratively form layers of a three-dimensional object 330. In some examples, the three-dimensional printing systems can include a printhead, a binder agent, a coalescing solvent, a coloring agent, an oven, or combinations thereof. The polymer build material, the binder agent, the coalescing solvent, and/or the coloring agent may be as described in further detail herein.

The three-dimensional printing systems can include a printhead 310 that can be fluidly coupled to or fluidly coupleable to the binder agent or the binder agent and the coalescing agent to selectively and iteratively eject fluid, binder agent and/or coalescing agent, onto successively placed individual layers of the polymer build material. A printhead, in further detail, can be a fluid ejector operable to selectively deposit jettable fluid(s), such as a binder agent, a coalescing agent, a coloring agent, or the like, onto the polymer build material to form individually patterned object layers. Fluid ejector(s) can be any type of printing apparatus capable of selectively applying the jettable fluid(s). For example, the printhead can be a fluid ejector, such as an inkjet printhead, e.g., a piezo-electric printhead, a thermal printhead, a continuous printhead, etc. The printhead could likewise be a sprayer, a dropper, or other similar structure for applying the coalescing agent to the polymer build material.

The printhead can be located on a carriage track, but could be supported by any of a number of structures, and may in some examples, be operable to move back and forth over the polymer build material along the carriage track when positioned over or adjacent to a powder bed of a build platform.

The three-dimensional printing systems can include a build platform 340 to support the polymer build material. The build platform can be positioned to permit application of the binder agent or the binder agent and the coalescing agent from the printhead onto a layer of the polymer build material. The build platform can be configured to drop in height, thus allowing for successive layers of polymer build material to be applied by a supply and/or spreader 350, which may be included as part of the system. The polymer build material may be layered in the build platform at a thickness that can range from about 5 µm to about 1 cm. In some examples, individual layers that can be applied in the build platform can have a uniform thickness. A thickness of a layer of the polymer build material can range from about 50 µm to about 1 mm, from about 100 µm to about 500 µm, or from about 500 µm to about 1 mm.

Following the selective application of a binder agent, or a binder agent and a coalescing agent to the polymer build material, the polymer build material can be exposed to heat from the radiant heat source. The radiant heat source can be an infrared (IR) or near-infrared light source, such as IR or near-IR curing lamps, IR or near-IR light emitting diodes (LED), or lasers with the desirable IR or near-IR electromagnetic wavelengths, and can emit radiation having a wavelength ranging from about 400 nm to about 1 mm. In some examples, the radiant heat source can be operatively connected to a lamp/laser driver, an input/output temperature controller, and/or temperature sensors.

The three-dimensional printing systems can include an oven 350 operable to apply heat to the three-dimensional object at a temperature to heat-fuse the polymer build particles and to form the polymeric particle-fused three-dimensional object. The oven can be a vacuum oven in some examples.

Polymer Build Materials

The polymer build material can be used as the bulk material of the three-dimensional printed object. As mentioned, the polymer build material can include from about 80 wt % to 100 wt % polymer build particles. In some examples, the polymer build material can include from about 85 wt % to about 95 wt %, from about 90 wt % to 100 wt %, or 100 wt % polymer build particles.

The polymer build particles can include polyamide-6, polyamide-8, polyamide-9, polyamide-11, polyamide-12, polyamide-6,6, polyamide-6,12, polyamide-8,12, polyamide, thermoplastic polyamide elastomer, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or copolymers thereof. In some examples, the polymer build particles can include polyamide particles. Example polyamide particles that can be used include polyamide-6, polyamide-8, polyamide-9, polyamide-11, polyamide-12, polyamide-6,6, polyamide-6,12, polyamide-8,12, polyamide, thermoplastic polyamide elastomer, polymer blends thereof, amorphous polymers thereof, core-shell polymers thereof, a copolymer thereof, or an admixture thereof. In other examples, the polymer build material can include polyamides such as polyamide-6, polyamide-12, thermoplastic polyamide elastomers, or an admixture thereof. The polymer build material can include a thermoplastic polyamide elastomer. Other types of polymer build particles that can be used include polyethylene, wax, thermoplastic polyurethane, acrylonitrile butadiene styrene, polymethylmethacrylate, ethylene-vinyl acetate, polyacrylate, aromatic polyesters, silicone rubber, polypropylene, polyester, polycarbonate, copolymers of polycarbonate with acrylonitrile butadiene styrene, copolymers of polycarbonate with polyethylene terephthalate, polyether ketone, polyacrylate, polystyrene, polyvinylidene fluoride, poly(vinylidene fluoride-trifluoroethylene), poly(vinylidene fluoride-trifluoroethylene-chlorotrifluoroethylene), mixtures thereof, or the like.

If fillers are included, examples can include inorganic particles such as alumina, silica, fibers, glass fibers, glass beads, carbon nanotubes, or combinations thereof. When the polymer build particles fuse together, the filler particles can become embedded in the polymer, forming a composite material. The filler can include a free-flow agent, anti-caking agent, or the like. Such agents can prevent packing of the powder particles, coat the powder particles and smooth edges to reduce inter-particle friction, and/or absorb moisture. The filler particles can be included in the polymer build material of the powder bed at about 0.01 wt % to about 20 wt %, from about 0.1 wt % to about 10 wt %, or from about 0.2 wt % to about 5 wt %, for example, based on the total weight of the polymer build material.

The polymer build material may include similarly sized polymer build particles and/or differently sized polymer build particles. The terms "particle size" or "average particle size" as used herein (either in the context of the polymer build particles or the polymer binder particles) can refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles can scatter light at smaller angles, while small particles can scatter light at larger angles. The particle analyzer can analyze the angular scattering data to calculate the size of the particles using the Mie theory of light scattering. Particle size can be reported as a volume equivalent sphere diameter. An "average" particle size can refer to a mathematical average of the particle sizes. The polymer build particles can have an average particle size from about 50 μm to about 1 mm, from about 50 μm to about 500 μm, from about 250 μm to about 500 μm, from about 100 μm to about 800 μm, from about 500 μm to about 1 mm, from about 250 μm to about 750 μm, or from about 750 μm to about 1 mm.

The polymer build material of the powder bed can include the polymer build particles (and in some instances other types of particles blended therewith) having a variety of shapes, such as spherical particles (average aspect ratio of about 1:1) or irregularly-shaped particles (average aspect ratios of about 1:1 to about 1:2). Other average aspect ratios can also be used, e.g., from about 1:1.2 to about 1:5, from about 1:1.5 to about 1:3, etc. If other particles are present, they can have a similar or different aspect ratio relative to the polymer build particles.

The polymer build material can be capable of being formed into three-dimensional printed objects with a resolution of about 20 μm to about 150 μm, about 20 μm to about 100 μm, about 30 μm to about 90 μm, or about 40 μm to about 80 μm. As used herein, "resolution" refers to the size of the smallest feature that can be formed on a three-dimensional printed object. To achieve this resolution, the polymer powder can have an average particle size from about 10 μm to about 150 μm, from about 20 μm to about 100 μm, from about 30 μm to about 90 μm, from about 40 μm to about 80 μm, or from about 20 μm to about 50 μm, for example. With smaller average particle sizes, there can be more flexibility regarding how thick the individual layers may be, for example. For example, in alignment with the resolutions described above, the polymer powder can form layers from about 20 μm to about 150 μm thick, or any of the sub-range resolutions mentioned above. This can provide a resolution in the z-axis direction (e.g., depth or direction of three-dimensional object build-up) of about 20 μm to about 150 μm. Likewise, the polymer build particles can also have these sizes so that they are sufficiently small to provide about 20 μm to about 150 μm resolution along the x-axis and y-axis (e.g., the axes parallel to the top surface of the powder bed). The x-axis and y-axis resolution will be noticeable at the edges or ends of the printed object at side surfaces during the build. With this in mind, it is notable that in other examples, thicker layers of polymer can be used when high resolution is not demanded, e.g., individual polymer build material layers can be applied at from about 150 μm to about 300 μm, and/or larger particles can likewise be used as may be practical. Thus, in more practical terms, a range of polymer powder thickness can be from about 20 μm to about 300 μm and/or an average particle size can be from about 10 μm to about 275 μm, with subranges as set forth above.

The polymer build particles can have a melting temperature from about 70° C. to about 275° C., depending on the specific particles selected for use. In some examples, the polymer build particles can have a melting point from about 125° C. to about 250° C., or from about 150° C. to about 200° C. In other examples, polyamide-12 particles can have a melting temperature within the range of about 125° C. to about 275° C. or from about 170° C. to about 200° C., for example. Thermoplastic polyamide elastomer (TPA) can have a melting temperature from about 120° C. to about 210° C. or from about 130° C. to about 180° C. On the other hand, various polymer build particles described herein can have a softening point that is near or relatively distant in temperature from the melting point, ranging from about 60° C. to about 250° C., depending on a variety of factors. Softening point can be determined, for example, using the Vicat method (ASTM-D1525 or ISO 306).

Binder Agents

Binder agents can include an aqueous liquid vehicle and dispersed polymer binder particles. The aqueous liquid vehicle can include water, and in some instances, other fluids, such as organic cosolvent, surfactant, or the like. The polymer binder particles can have a melting temperature that can be less than a melting temperature of the polymer build particles of the polymer build material and/or can have a melting temperature reducible by a coalescing solvent to a melting temperature that is less than a melting temperature of the polymer build particles of the polymer build material The dispersed polymer binder particles can have a melting temperature (or a reduced melting temperature when a coalescing solvent is used to reduce the melting temperature) that can be from about 60° C. to about 160° C., from about 60° C. to about 90° C., from about 60° C. to about 120° C., from about 80° C. to about 160° C., or from about 70° C. to about 90° C. The dispersed polymer binder particles can form a network that can adhere or glue polymer build particles of the polymer build material to one another.

Thus, the dispersed polymer binder particles can provide cohesiveness in forming and/or holding the shape of the three-dimensional object. The dispersed polymer binder particles can melt and become miscible. Once miscible, the polymer thereof can intermix with chains of the polymer build particles and, if a surface thereof becomes melted, the polymer of the dispersed polymer binder particles and a polymer of the polymer build particles can become entangled with one another.

The dispersed polymer binder particles, in further detail, can have different morphologies. In some examples, the dispersed polymer binder particles can include two different copolymer compositions, which may be fully separated core-shell polymers, partially occluded mixtures, or intimately comingled as a polymer solution. In other examples, the dispersed polymer binder particles can be individual spherical particles containing polymer compositions of hydrophilic (hard) component(s) and/or hydrophobic (soft) component(s) that can be interdispersed. The interdispersion can be according to IPN (interpenetrating networks). The dispersed polymer binder particles can be composed of a hydrophobic core surrounded by a continuous or discontinuous hydrophilic shell. For example, the particle morphology can resemble a raspberry, in which a hydrophobic core can be surrounded by several smaller hydrophilic particles that can be attached to the core. The dispersed polymer binder particles can include 2, 3, 4, or more relatively large polymer build particles that can be attached to one another or can surround a smaller polymer core. The dispersed polymer binder particles can have a single phase morphology that can be partially occluded, can be multiple-lobed, or can include any combination of any of the morphologies disclosed herein.

The dispersed polymer binder particles can include particles that can be heteropolymers or copolymers. As used herein, a heteropolymer can include a hydrophobic component and a hydrophilic component. A heteropolymer can include a hydrophobic component that can include from about 65% to about 99.9% (by weight of the heteropolymer), and/or a hydrophilic component that can include from about 0.1% to about 35% (by weight of the heteropolymer). In some examples, the hydrophobic component can have a lower glass transition temperature than the hydrophilic component.

The dispersed polymer binder particles can be a latex and can be composed of a polymerization or co-polymerization of acrylic monomers, styrene monomers, methacrylate monomers, or a combination thereof. Example monomers can include, C1-C20 linear or branched alkyl (meth)acrylate, alicyclic (meth)acrylate, alkyl acrylate, styrene, methyl styrene, polyol (meth)acrylate, hydroxyethyl (meth)acrylate, (meth)acrylic acid, or a combination thereof. Examples can include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexyl methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, or a combination thereof. In some examples, the latex can include acrylate, styrene acrylate, styrene, methacrylate, styrene methacrylate, or a combination thereof. In other examples, the latex can be a styrene (meth)acrylate copolymer. The term "(meth)acrylate" or "(meth)acrylic acid" or the like refers to monomers, copolymerized monomers, etc., that can either be acrylate or methacrylate (or a combination of both), or acrylic acid or methacrylic acid (or a combination of both). The terms "(meth)acrylate" and "(meth)acrylic acid" can be used interchangeably, as acrylates and methacrylates are salts and esters of acrylic acid and methacrylic acid, respectively. Furthermore, mention of one compound over another can be a function of pH and pH modifications during preparation or subsequently when added to an ejectable fluid, such as a binder agent, can impact the nature of the moiety as well (acid form vs. salt or ester form). Thus, a monomer or a moiety of a polymer described as (meth)acrylic acid or as (meth)acrylate should not be read so rigidly as to not consider relative pH levels, ester chemistry, and/or other general organic chemistry concepts. The latex polymer can include copolymerized monomers selected from acrylate esters, styrene-based monomers, methacrylate esters, or a combination thereof, for example.

The dispersed polymer binder particles can have a weight average molecular weight (Mw) that can range from about 5,000 Mw to about 2,000,000 Mw. In some examples, the weight average molecular weight can range from about 100,000 Mw to about 1,000,000 Mw, from about 100,000 Mw to about 500,000 Mw, from about 150,000 Mw to about 300,000 Mw, or from about 50,000 Mw to about 250,000 Mw. Weight average molecular weight (Mw) can be measured by Gel Permeation Chromatography with polystyrene standard.

The dispersed polymer binder particles can be latent and can be activated by heat (applied iteratively). In these instances, the activation temperature can correspond to the minimum film formation temperature (MFFT) or a glass transition temperature (Tg) which can be greater than ambient temperature. As mentioned herein, "ambient temperature" may refer to room temperature (e.g., ranging about 18° C. to about 22° C.). In some examples, the dispersed polymer binder particles can have an MFFT or Tg that can be at least about 15° C. greater than ambient temperature. In other examples, the MFFT or the Tg of the bulk material (e.g., the more hydrophobic portion) of the dispersed polymer binder particles can range from about 25° C. to about 200° C. The dispersed polymer binder particles may have an MFFT or Tg ranging from about 40° C. to about 120° C. The dispersed polymer binder particles can have an MFFT or Tg ranging from about 50° C. to about 150° C. At a temperature above the MFFT or the Tg of a dispersed polymer binder particles, the dispersed polymer binder particles can coalesce and can bind materials.

The dispersed polymer binder particles can have a particle size that can be jetted via thermal ejection or printing, piezoelectric ejection or printing, drop-on-demand ejection or printing, continuous ejection or printing, etc. In some examples, a particle size of the dispersed polymer binder particles can range from about 5 nm to about 500 nm, or from about 10 nm to about 400 nm. In other examples, a particle size of the dispersed polymer binder particles can range from about 10 nm to about 300 nm, from about 50 nm to about 250 nm, from about 100 nm to about 300 nm, or from about 25 nm to about 250 nm The dispersed polymer binder particles can be present based on a total weight of the binder agent at from about 2 wt % to about 20 wt %. In other more detailed examples, the dispersed polymer binder particles can be present at from about 8 wt % to about 16 wt %, from about 10 wt % to about 20 wt %, from about 5 wt % to about 15 wt %, or from about 6 wt % to about 18 wt % in the binder agent.

Coalescing Solvents

Coalescing solvent can be included as a component of the binder agent or can be included in a separate coalescing agent. The coalescing agent, when present, can include an aqueous liquid vehicle and a coalescing solvent. In some examples, the coalescing agent can include, or can consist essentially of, the coalescing solvent in an aqueous liquid vehicle. The aqueous liquid vehicle can include water, and in some instances, other fluids, such as organic cosolvent (in addition to the coalescing solvent), surfactant, or the like.

The coalescing solvent can depress a melting point of polymer build particles of a polymer build material by about 1° C. to about 20° C. resulting in a modified melting point from about 90° C. to about 200° C. The coalescing solvent can depress a melting point of the polymer build particles by about 1° C. to about 10° C., from about 10° C. to about 20° C., or from about 5° C. to about 15° C. The depressing can result in in a modified melting point ranging from 90° C. to about 120° C., from about 150° C. to about 200° C., from about 150° C. to about 200° C., or from about 120° C. to about 180° C. In some examples, the coalescing solvent can reduce a melting temperature of the dispersed polymer binder particles to a temperature less than the melting point of the polymer build particles of the polymer build material.

The coalescing agent can be applied with precision to certain areas of a polymer build material that are desired to form a layer of the final three-dimensional printed object. After applying the coalescing agent, the powder bed material can be heated. The coalescing solvent from the coalescing agent can depress a melting point of the polymer build particles and/or the polymer binder particles so that the polymer build particles in contact with the coalescing solvent can melt at a surface thereof and can fuse together. An appropriate amount of heat can be applied so that the area of the powder bed material that was printed with the coalescing solvent heats to a temperature greater than the depressed melting point to melt a portion of the polymer build particles, while the powder bed material that was not printed with the coalescing agent remains below a melting temperature of a polymer of the polymer build particles and remains as a loose powder with separate distinct polymer build particles.

The coalescing solvent, in further detail, can be selected from 1-(2-hydroxyethyl)-2-pyrrolidone, 1,5-pentanediol, benzyl alcohol, ester alcohols, glycol ethers, esters, dimethylsulfoxide, hexafluoroisopropanol, cresol, diols, 1,2-butanediol, 1-methyl-2,3-propanediol, 2-pyrrolidone, glycerol, 2-phyenoxyethanol, 2-phenylethanol, 3-phenylpropanol or a combination thereof. In some examples, the coalescing solvent can be selected from 1-(2-hydroxyethyl)-2-pyrrolidone, 1,5-pentanediol, benzyl alcohol, ester alcohols, glycol ethers, esters, dimethylsulfoxide, hexafluoroisopropanol, cresols, diols, or a combination thereof. In other examples, the coalescing solvent can include diols, cresols, ester alcohols, glycol ethers, esters, or a combination thereof. The coalescing solvent can include 1-(2-hydroxyethyl)-2-pyrrolidone, 1,5-pentanediol, benzyl alcohol, dimethylsulfoxide, hexafluoroisopropanol, 1,2-butanediol, 1-methyl-2,3-propanediol, 2-pyrrolidone, glycerol, 2-phyenoxyethanol, 2-phenylethanol, 3-phenylpropanol or a combination thereof. The coalescing solvent can include 1-(2-hydroxyethyl)-2-pyrrolidone, 1,5-pentanediol, benzyl alcohol, or a combination thereof. In other examples, the coalescing solvent can include 1-(2-hydroxyethyl)-2-pyrrolidone, benzyl alcohol, or a combination thereof in other examples. The coalescing solvent can include 1,5-pentanediol, benzyl alcohol, or a combination thereof. The coalescing solvent can include benzyl alcohol.

The amount of coalescing solvent can vary. For example, the concentration of coalescing solvent in the binder agent or the coalescing agent can range from about 30 wt % to about 70 wt %. In some examples, an amount of the coalescing solvent in the binder agent or the coalescing agent can range from about 30 wt % to about 60 wt %, from about 40 wt % to about 70 wt %, from about 50 wt % to about 70 wt %, or from about 40 wt % to about 60 wt %.

Aqueous Liquid Vehicles

As used herein, the term "aqueous liquid vehicle" may refer to the liquid in the binder agent, the coalescing agent and/or other fluid agents or dispersed particles that may be present, e.g., water, other organic cosolvent(s), surfactant, latex polymer, colorant, e.g., pigment and/or solvent, etc. The aqueous liquid vehicle may include water alone or may include water in combination with a variety of additional components. Examples of components that may also be present, in addition to water, may include organic co-solvent, surfactant, buffer, antimicrobial agent, anti-kogation agent, chelating agent, buffer, colorant, latex polymer, etc. For example, the aqueous liquid vehicle may be water and an organic co-solvent, other than the coalescing solvent. The aqueous liquid vehicle can include water, organic co-solvent, and/or a surfactant. The aqueous liquid vehicle can include water, organic co-solvent, surfactant, and/or antimicrobial agent. The aqueous liquid vehicle can include water, organic co-solvent, surfactant, antimicrobial agent, and/or a chelating agent. Other combinations of components can also be prepared in formulating the coalescing agent.

The aqueous liquid vehicle can include water that may be deionized, for example. Water can be present in the fluid agent at a weight percentage that can vary from about 20 wt % to about 70 wt %, from about 20 wt % to about 60 wt %, from about 50 wt % to about 70 wt %, or from about 30 wt % to about 60 wt %.

Organic co-solvent(s), other than the coalescing solvent(s) that may be present, can include ethanol, methanol, propanol, acetone, tetrahydrofuran, hexane, 1-butanol, 2-butanol, tert-butanol, isopropanol, propylene glycol, triethylene glycol, methyl ethyl ketone, dimethylformamide, 1,4-dioxone, acetonitrile, or a combination thereof. Whether a single organic co-solvent is included or a combination of organic co-solvents are included, a total amount of organic co-solvent(s) (other than the coalescing solvent), if present, can range from about 0.01 wt % to about 30 wt %, from about 1 wt % to about 30 wt %, from about 5 wt % to about 30 wt %, from about 5 wt % to about 25 wt %, or from about 1 wt % to about 10 wt %, based on a total weight percentage of the coalescing agent. Again, this weight percentage does not include the content of the coalescing solvent.

The aqueous liquid vehicle may also include surfactant. The surfactant can include a non-ionic surfactant, a cationic surfactant, and/or an anionic surfactant. In some examples, the fluid agent can include an anionic surfactant. In other examples, the fluid agent can include a non-ionic surfactant. The fluid agent can include a blend of both anionic and/or non-ionic surfactant. Example non-ionic surfactant that can be used include self-emulsifiable, nonionic wetting agents based on acetylenic diol chemistry (e.g., SURFYNOL®

SEF from Air Products and Chemicals, Inc., USA), a fluorosurfactant (e.g., CAPSTONE® fluorosurfactants from DuPont, USA), or a combination thereof. The surfactant can be an ethoxylated low-foam wetting agent (e.g., SURFYNOL® 440, SURFYNOL® 465, or SURFYNOL® CT-111 from Air Products and Chemical Inc., USA) or an ethoxylated wetting agent and/or molecular defoamer (e.g., SURFYNOL® 420 from Air Products and Chemical Inc., USA). Still other surfactants can include wetting agents and/or molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, or TERGITOL® 15S9 from The Dow Chemical Company, USA), or a combination thereof. The surfactant can include a non-ionic organic surfactant (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, or TERGITOL® 15-S-30 all from Dow Chemical Company, USA), or a combination thereof. Example anionic surfactants can include alkyldiphenyloxide disulfonate (e.g., DOWFAX® 8390 and/or DOWFAX® 2A1 from The Dow Chemical Company, USA), or oleth-3 phosphate surfactant (e.g., CRODAFOS™ N3 Acid and/or CRODAFOS™ O3A both from Croda, UK). Example cationic surfactant that can be used can include dodecyltrimethylammonium chloride, hexadecyldimethylammonium chloride, or a combination thereof. In some examples, the surfactant (which may be a blend of multiple surfactants) may be present in the binder agent, the coalescing agent, or other fluid agent at an amount ranging from about 0.01 wt % to about 2 wt %, from about 0.05 wt % to about 1.5 wt %, or from about 0.01 wt % to about 1 wt %.

The aqueous liquid vehicle may also include antimicrobial agents. Antimicrobial agents can include biocides and/or fungicides. Example antimicrobial agents can include the NUOSEPT® (Ashland Inc., USA), VANCIDE® (R.T. Vanderbilt Co., USA), ACTICIDE® B20 and/or ACTICIDE® M20 (Thor Chemicals, U.K.), PROXEL® GXL (Arch Chemicals, Inc., USA), BARDAC® 2250, 2280, BARQUAT® 50-65B, or CARBOQUAT® 250-T, (Lonza Ltd. Corp., Switzerland), KORDEK® MLX (The Dow Chemical Co., USA), or combinations thereof. If included, a total amount of antimicrobial agents in the binder agent, the coalescing agent, or other fluid agent can range from about 0.01 wt % to about 1 wt %.

An aqueous liquid vehicle may include buffer solution(s) that can withstand small changes (e.g., less than 1) in pH when small quantities of a water-soluble acid or a water-soluble base are added to a composition containing the buffer solution(s). The buffer solution(s) can have pH ranges from about 5 to about 9.5, from about 7 to about 9, or from about 7.5 to about 8.5. The buffer solution(s) can include a poly-hydroxy functional amine. In some examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine, N,N,N'N'-tetrakis-(2-hydroxypropyl)-ethylenediamine, beta-alanine, betaine, or mixtures thereof. In other examples, the buffer solution(s) can include 2-amino-2-(hydroxymethyl)-1,3-propanediol (TRIZMA® sold by Sigma-Aldrich, USA), beta-alanine, betaine, or mixtures thereof. The buffer solution, if included, can be added to the binder agent, the coalescing agent, or other fluid agent at an amount ranging from about 0.01 wt % to about 10 wt %, from about 0.1 wt % to about 7.5 wt %, or from about 0.05 wt % to about 5 wt %.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10% or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "kit(s)" can be synonymous with and understood to include a plurality of multiple components where the different components can be separately contained (though in some instances co-packaged in separate containers) prior to use, but these components can be combined together during use, such as during the three-dimensional object build processes described herein. The containers can be any type of a vessel, box, or receptacle made of any material.

As used herein, "applying" when referring to fluid agent, such as a binder agent, coalescing agent that may be used, for example, refers to any technology that can be used to put or place the fluid, e.g., binder agent, coalescing agent, or the like, on the polymeric build material or into a layer of polymer build material for forming a three-dimensional object. For example, "applying" may refer to a variety of dispensing technologies, including "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters, up to about 30 picoliters, or up to about 50 picoliters, etc. Example ranges may include from about 2 picoliters to about 50 picoliters, or from about 3 picoliters to about 12 picoliters.

As used herein, a plurality of items, structural elements, compositional elements, and/or materials may be presented in a common list for convenience. However, these lists should be construed as though an individual member of the list is identified as a separate and unique member. Thus, no individual member of such list should be construed as a de facto equivalent of any other member of the same list based on presentation in a common group without indications to the contrary.

Concentrations, dimensions, amounts, and/or other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative three-dimensional methods, three-dimensional printing kits, and/or three-dimensional printing systems may be devised without departing from the present disclosure. The appended claims are intended to cover such modifications and arrangements.

Example 1—Preparation of Binder Agents

A binder agent formulation is prepared by admixing the respective components as shown in Table 1 below.

TABLE 1

Binder Agent Formulations

| | | Formulation ID | |
|---|---|---|---|
| Component | Type | A (wt %) | B (wt %) |
| Latex | Dispersed Polymer Binder Particles | 16 | 16 |
| Tergitol ® TMN-6 | Surfactant | 0.9 | 0.9 |
| 1,2-butanediol | Coalescing Solvent | — | 26 |
| Deionized Water | Solvent | Balance | Balance |

TERGITOL ® is available from Sigma Aldrich (USA).

The above formulations are initially tested for jettability by individually dispensing the formulations as bars printed onto a paper medium using an HP® ink jet printer. The binder agent formulations do not exhibit any negative effects on decap or nozzle health of the print head.

Example 2—Preparation of Three-Dimensional Objects

In order to test the fusing capability of the binder agent formulations from Table 1 above, six three-dimensional objects in the shape of rectangles are formed. The polymer build particles of the polymer build material include 100 wt % polyamide-12 powder. The three-dimensional objects that are formed had varying thicknesses. The powder is held at an elevated temperature of about 55° C. during printing. The individual layers are printed with binder agents from Table 1 are printed with 4 passes, 5 passes, and 7 passes at a 17 gsm per pass onto the polyamide-12 powder to form a three-dimensional object. The individual layers are iteratively exposed to heat at about 100° C., 130° C., or 150° C. for 30 minutes. All of the three-dimensional printed objects fuse following exposure to heat and are capable of being moved from the powder bed as a polymeric particle-fused three-dimensional object. High selectivity is observed. Areas of the polymer build material which are not printed with the binder agent do not become fused. The three-dimensional objects formed with the binder agent Formulation B may exhibit additional strength due to the presence of the coalescing solvent that is also included therein. The three-dimensional printed objects are cured in a vacuum oven for three hours at greater than about 150° C.

The examples above indicate that a binder agent can be used to fuse polyamide particles to one another without the need for a conventional fusing agent including a radiation absorber. The binder agent can permit the formation of porous polymeric three-dimensional objects which would not be porous if the object was formed using a conventional fusing agent and radiation absorber. The three-dimensional printing process can enable the formation of complex polymeric filters.

What is claimed is:

1. A method of three-dimensional printing, comprising:
   iteratively applying a polymer build material as individual layers to a powder bed, wherein the polymer build material includes from about 80 wt % to 100 wt % polymer build particles;
   based on a three-dimensional object model, selectively applying a binder agent including an aqueous liquid vehicle and polymer binder particles onto individual layers of the polymer build material to leave polymer binder particles therewith, wherein the polymer binder particles have an average particle size from about 5 nm to about 500 nm and have a melting temperature that is lower than a melting temperature of the polymer build particles of the build material or a melting temperature reducible by a coalescing solvent to a melting temperature that is lower than a melting temperature of the polymer build particles of the build material; and
   exposing the powder bed to heat at a temperature less than a melting point of the polymer build particles but greater than a melting temperature of the polymer binder particles, wherein the heat causes the polymer binder particles to melt and adhere the polymer build particles of the polymeric build material together to form a three-dimensional object.

2. The method of three-dimensional printing of claim 1, wherein the polymer build particles include polyamide-6, polyamide-8, polyamide-9, polyamide-11, polyamide-12, polyamide-6,6, polyamide-6,12, polyamide-8,12, polyamide, thermoplastic polyamide, polyethylene, polyethylene terephthalate (PET), polystyrene, polyacrylate, polyacetal, polypropylene, polycarbonate, polyester, acrylonitrile butadiene styrene, thermoplastic polyurethane, engineering plastic, polyetheretherketone (PEEK), polymer blends thereof, amorphous polymers thereof, core-shell polymers thereof, or copolymers thereof, and wherein the polymer build particles have an average particle size from about 50 μm to about 1 mm.

3. The method of three-dimensional printing of claim 1, wherein the polymer binder particles are a latex polymer including copolymerized monomers selected from acrylate esters, styrene-based monomers, methacrylate esters, or a combination thereof; and
   wherein the polymer binder particles are present in the binder agent at from about 2 wt % to about 20 wt %.

4. The method of three-dimensional printing of claim 1, wherein the heat creates a temperature range of from about 60° C. to about 160° C. at the powder bed, and the polymer binder particles become miscible and entangle with chains of the polymer build particles.

5. The method of three-dimensional printing of claim 1, further comprising separating the three-dimensional object from the powder bed and heat fusing the three-dimensional object further to form a polymeric particle-fused three-dimensional object.

6. The method of three-dimensional printing of claim 5, wherein the baking occurs in a vacuum oven at a temperature ranging from about 125° C. to about 175° C. for a time period from about 30 minutes to about 8 hours.

7. The method of three-dimensional printing of claim 1, further comprising
selectively applying the coalescing solvent either together with the binder agent or separately in a coalescing agent onto individual layers of the polymer build material;
wherein the coalescing solvent depresses a melting temperature of the polymer build particles, the polymer binder particles, or both, and
wherein exposing of the powder bed to the heat selectively coalesces portions of individual layers of the polymer build material in contact with the coalescing solvent to form a polymeric particle-fused three-dimensional object.

8. The method of three-dimensional printing of claim 7, wherein the polymer binder particles and the coalescing solvent are selectively applied by ejecting the binder agent and the coalescing agent onto the polymer build material.

9. The method of three-dimensional printing of claim 7, wherein polymer binder particles and the coalescing solvent are selectively applied by ejecting the binder agent containing both the polymer binder particles and the coalescing solvent in a common formulation.

10. A three-dimensional printing kit, comprising:
a polymer build material including from about 80 wt % to 100 wt % polymer build particles; and
a binder agent including an aqueous liquid vehicle and polymer binder particles having an average particle size from about 5 nm to about 500 nm and a melting temperature that is lower than a melting temperature of the polymer build particles of the build material or a melting temperature reducible by a coalescing solvent to a melting temperature that is lower than a melting temperature of the polymer build particles of the build material; and
wherein the three-dimensional printing kit does not require a fusing agent with a radiation absorber.

11. The three-dimensional printing kit of claim 10, further comprising a coalescing solvent that depresses a melting temperature of the polymer build particles, the polymer binder particles, or both, and
wherein the coalescing solvent is present at from about 30 wt % to about 70 wt % in the binder agent or is present at from about 30 wt % to about 70 wt % in a separate coalescing agent.

12. The three-dimensional printing kit of claim 10, wherein the polymer binder particles are a latex polymer including copolymerized monomers selected from acrylate esters, styrene-based monomers, methacrylate esters, or a combination thereof; and
wherein the polymer binder particles are present in the binder agent at from about 2 wt % to about 20 wt %.

13. A system for three-dimensional printing, comprising;
a polymer build material including from about 80 wt % to 100 wt % polymer build particles;
a binder agent including an aqueous liquid vehicle and polymer binder particles having an average particle size from about 5 nm to about 500 nm and a melting temperature that is lower than a melting temperature of the polymer build particles of the build material or a melting temperature reducible by a coalescing solvent to a melting temperature that is lower than a melting temperature of the polymer build particles of the build material; and
a radiant heat source positioned or positionable to expose a powder bed of the polymer build material to heat at a temperature less than a melting point of the polymer build particles but greater than a melting temperature of the polymer binder particles, wherein the heat causes the polymer binder particles to melt and adhere the polymer build particles together to form a three-dimensional object.

14. The system for three-dimensional printing of claim 13, further comprising an oven to apply heat to the three-dimensional object at a temperature to heat-fuse the polymer build particles to form a polymeric particle-fused three-dimensional object.

15. The system for three-dimensional printing of claim 13, further comprising a coalescing solvent to depress a melting point of the polymer build particles, the polymer binder particles, or both,
wherein the coalescing solvent depresses a melting temperature of the polymer build particles, the polymer binder particles, or both, and
wherein exposing of the powder bed to the heat selectively coalesces portions of individual layers of the polymer build material in contact with the coalescing solvent to form a polymeric particle-fused three-dimensional object.

* * * * *